(12) United States Patent
Redmond et al.

(10) Patent No.: US 10,776,582 B2
(45) Date of Patent: Sep. 15, 2020

(54) SUPPORTING COMBINATIONS OF INTENTS IN A CONVERSATION

(71) Applicant: INTERNATIONAL BUSINESS MACHINES CORPORATION, Armonk, NY (US)

(72) Inventors: Robert N. Redmond, Smyrna, GA (US); Florian Pinel, New York, NY (US); Donna K. Byron, Petersham, MA (US); Will Spann, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 16/001,777

(22) Filed: Jun. 6, 2018

(65) Prior Publication Data
US 2019/0377790 A1 Dec. 12, 2019

(51) Int. Cl.
*G06F 40/30* (2020.01)
*G06F 40/205* (2020.01)
(Continued)

(52) U.S. Cl.
CPC ............ *G06F 40/30* (2020.01); *G06F 40/205* (2020.01); *G06F 40/295* (2020.01);
(Continued)

(58) Field of Classification Search
CPC ...... G06F 40/30; G06F 16/3329; G06F 40/35; G06F 40/295; G06F 16/9024; G06F 40/20; G06F 40/10; G06F 40/205; G06F 40/56; G06F 16/84; G06F 40/284; G06F 16/243; G06F 16/355; G06F 40/279; G06F 16/285; G06F 16/3344; G06F 16/90332;
(Continued)

(56) References Cited

U.S. PATENT DOCUMENTS 7,983,997 B2 7/2011 Allen et al.
8,275,803 B2 9/2012 Brown et al.
(Continued)

OTHER PUBLICATIONS

Baeza-Yates, "Semantic Query Understanding," SIGIR '17 Proceedings of the 40th International ACM SIGIR Conference on Research and Development in Information Retrieval, pp. 1357-1357.

*Primary Examiner* — Huyen X Vo
(74) *Attorney, Agent, or Firm* — Conley Rose, P.C.

(57) ABSTRACT

A computer-implemented method for supporting combinations of intents in a conversation service. In one embodiment, the computer-implemented method provides a conversation service using a set of conversation trees. Each conversation tree within the set of conversation trees comprises a list of intents that define how to answer to a certain type of user input. The computer-implemented method creates an intent graph using the list of intents of each conversation tree within the set of conversation trees. The computer-implemented method adds composite intents to the set of conversation trees using the intent graph to generate a set of updated conversation trees. The computer-implemented method configures the conversation service to use the set of updated conversation trees that comprises composite intents for supporting combinations of intents.

20 Claims, 8 Drawing Sheets

(51) Int. Cl.
*G06F 40/295* (2020.01)
*G10L 15/22* (2006.01)
*G10L 15/02* (2006.01)
*G10L 13/04* (2013.01)

(52) U.S. Cl.
CPC ............ *G10L 13/043* (2013.01); *G10L 15/02* (2013.01); *G10L 15/22* (2013.01); *G10L 2015/223* (2013.01)

(58) Field of Classification Search
CPC ...... G06F 40/211; G06F 40/14; G06F 40/289; G06F 2203/0381; G06F 16/24578; G06F 3/0481; G06F 40/268; G06F 3/167; G06F 40/247; G06F 16/951; G06F 40/253; G06F 9/451; G06F 16/9562; G10L 15/22; G10L 15/1815; G10L 15/1822; G10L 15/26; G10L 15/18; G10L 15/065; G10L 2015/0638; G10L 15/00; G10L 15/063; G10L 21/06; G10L 15/183; G10L 2015/223; G10L 15/265; G10L 2015/088; G10L 15/02; G10L 15/08; G10L 2015/225; G10L 15/30; G10L 15/32; G10L 2015/228; G10L 25/63; G10L 13/00; G10L 13/08; G10L 15/19; G10L 2013/083

See application file for complete search history.

(56) References Cited

U.S. PATENT DOCUMENTS

| | | | |
|---|---|---|---|
| 9,536,195 | B2 | 1/2017 | Linehan et al. |
| 9,536,196 | B2 | 1/2017 | Linehan et al. |
| 9,569,288 | B2 | 2/2017 | Cui et al. |
| 9,798,719 | B2 | 10/2017 | Karov et al. |
| 2007/0203693 | A1 | 8/2007 | Estes |
| 2012/0041903 | A1 | 2/2012 | Beilby et al. |
| 2014/0207776 | A1 | 7/2014 | Harris et al. |
| 2014/0279050 | A1 | 9/2014 | Makar et al. |
| 2014/0310001 | A1* | 10/2014 | Kalns .................. G10L 15/1822 704/270.1 |
| 2015/0278820 | A1 | 10/2015 | Meadows |
| 2017/0228367 | A1 | 8/2017 | Pasupalak et al. |
| 2017/0286401 | A1 | 10/2017 | He et al. |
| 2019/0057157 | A1* | 2/2019 | Mandal ............... G06F 16/9535 |
| 2019/0104092 | A1* | 4/2019 | Koohmarey ............ H04L 51/18 |
| 2019/0236205 | A1* | 8/2019 | Jia ........................... G06F 3/167 |

* cited by examiner

US 10,776,582 B2

SUPPORTING COMBINATIONS OF INTENTS IN A CONVERSATION

BACKGROUND

The present disclosure relates generally to cognitive digital assistant (CDA) systems. Today's CDAs, such as Apple's Siri® and Amazon's Alexa®, are programmed with artificial intelligence (AI), machine learning, and voice recognition technology. As the end user interacts with the digital assistant, the AI programming uses sophisticated algorithms to learn from the input of the user and become better at predicting the needs of the user. However, even with all the advances in technology, current CDA systems generally can only answer very simple basic questions.

SUMMARY

In one aspect, the disclosed embodiments include a computer-implemented method performed by a system for supporting combinations of intents. In one embodiment, the computer-implemented method provides a conversation service using a set of conversation trees. Each conversation tree within the set of conversation trees comprises a list of intents that define how to answer to a certain type of user input. The computer-implemented method creates an intent graph using the list of intents of each conversation tree within the set of conversation trees. The computer-implemented method adds composite intents to the set of conversation trees using the intent graph to generate a set of updated conversation trees. The computer-implemented method configures the conversation service to use the set of updated conversation trees that comprises composite intents for supporting combinations of intents.

In another aspect, the disclosed embodiments include a computer-implemented method performed by a system for dynamically supporting combinations of intents in a conversation service. In one embodiment, the computer-implemented method receives a user input from a user via a user device. The computer-implemented method determines input entities and output entities of the user input, a path in an intent graph that connects the input entities to the output entities, and a response to the user input using intent nodes in the path in the intent graph that connects the input entities to the output entities. The computer-implemented method provides the response to the user via the user device.

In another aspect, the disclosed embodiments include a system configured to support combinations of intents. The system includes memory for storing instructions, and a processor configured to execute the instructions to provide a conversation service using a set of conversation trees, each conversation tree within the set of conversation trees comprises a list of intents that define how to answer to a certain type of user input; create an intent graph using the list of intents of each conversation tree within the set of conversation trees; add composite intents to the set of conversation trees using the intent graph to generate a set of updated conversation trees; and configure the conversation service to use the set of updated conversation trees that comprises composite intents for supporting combinations of intents.

In another aspect, the disclosed embodiments include a computer program product comprising a computer readable storage medium having program instructions embodied therewith, the program instructions executable by a processor. Executing the program instructions causes the processor to provide a conversation service using a set of conversation trees, each conversation tree within the set of conversation trees comprises a list of intents that define how to answer to a certain type of user input; create an intent graph using the list of intents of each conversation tree within the set of conversation trees; add composite intents to the set of conversation trees using the intent graph to generate a set of updated conversation trees; and configure the conversation service to use the set of updated conversation trees that comprises composite intents for supporting combinations of intents.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
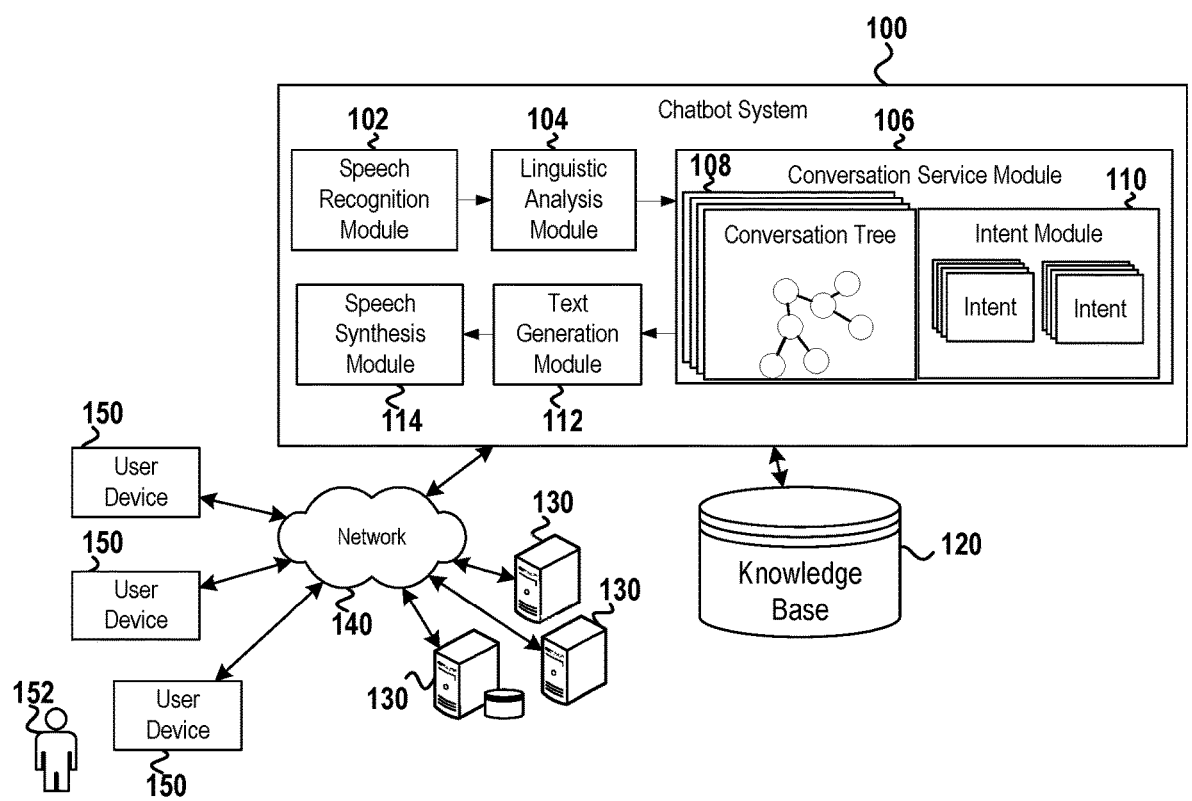
FIG. 1 is a schematic diagram illustrating a chatbot system in accordance with an embodiment of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

IBM Watson Conversation Service and other conversation services provide tools for building good natural language understanding components for a chatbot. A chatbot (also known as a talkbot, chatterbot, bot, instant messaging (IM) bot, interactive agent, or artificial conversational entity) is a computer program or an artificial intelligence which conducts a conversation via auditory or textual methods. Chatbots are typically configured to answer questions using a service API or corpus of documents. For instance, one or more API functions or document passages are typically mapped to a conversation intent. A conversation intent or intent represents a mapping between what a user says (i.e., input) and what action should be taken by chatbot based on the input. However, chatbots currently only map an input to a single intent and are not able to map a user input to a sequence of intents. For instance, the following exchanges are simple examples that illustrate the capability of current chatbots.

First Example

Question: When is the next Dodgers game?
Response: The Dodgers will play tomorrow in Los Angeles.
Question: What will be the weather tomorrow in Los Angeles?
Response: Tomorrow, in Los Angeles, you can expect a high of 74 degrees Fahrenheit.
Question: What will be the weather for the next Dodgers game?
Response: I'm sorry, I can't help with that.

Second Example

The second example is a chatbot for a hotel chain. In the below example, the chatbot includes one or more intents that allow users to search for hotels using various criteria. The chatbot also includes an intent that returns a description of any given hotel. The chatbot further includes intents for weather information and POI (point of interest) search.

Using this chatbot, the following exchange is an example conversation between a user and the chatbot:

Question: Give me the names of hotels in the Bahamas.
Response: Hotel A, Hotel B, Hotel C (using hotel search intent).
Question: Is there waterskiing near Hotel A? or Hotel B? or Hotel C?
Response: Yes, waterskiing is available near Hotel A (using POI intent).
Question. When is the warmest weather in the Bahamas?
Response: In July (using weather data).

However, the chatbot would not be able to answer the following question in one pass:

Question. Find me a hotel to go waterskiing in the Bahamas when the weather is the warmest.

Thus, as shown above, current chatbots are able to answer single intent questions (i.e., requires only a single mapping/lookup using a single intent), but are not able to map a user input to a sequence of intents to answer more complex (multiple intent) questions. Thus, the disclosed embodiments seek to improve chatbots by enabling support for combinations of intents in a conversation service. In various embodiments, existing atomic intents are tagged with input and output entities and relationships, and a graph representing all the entities supported by the conversation service, as well as the relationships that connect them, is created. As a result, user inputs that require executing multiple intents that were initially defined as distinct bits of dialogue functionality can be composed. The composition action may be applied either at workspace upload time to become a new trained intent, or alternatively, the composition action may be applied dynamically in response to received user inputs. Composite intents may then be handled using different techniques in various embodiments including. For example, in one embodiment, the system may be configured to inspect existing behaviors (conversation logs, intent call sequences, questions asked) to determine what composite intents are in demand, and automatically adds composite intents that are in demand to the conversation tree.

In another embodiment, composite intents may be assembled on the fly when a user request is received. As an example, using entity extraction, user queries are transformed into a tuple of input entity values and desired output entities. When possible, a path between the inputs and the output is identified in the entity graph, and the corresponding intents are called in sequence to produce the final answer. The two techniques may also be combined in various embodiments as described below. The disclosed embodiments provide several significant advances in technology including, but are not limited to, supporting intents that are not covered by the available conversation trees, composing the nodes in the conversation trees, and automatically adding nodes to the conversation tree.

FIG. 1 is a schematic diagram illustrating a chatbot system 100 in accordance with an embodiment of the present disclosure. In various embodiments, the chatbot system 100 is configured to provide information or answer questions received from one or more user devices 150 over a network 140. The network 140 may be any type of network that enables the chatbot system 100 to communicate with the one or more user devices 150 as well other devices such as network devices 130. The network devices 130 may be other servers, databases, or applications that provide one or more services to the chatbot system 100. For example, the network 140 may comprise of various networks including wired and wireless networks such as, but not limited to, one or more radio networks (e.g., cellular network or mobile network), local-area networks (LANs), wide-area networks (WANs), and metropolitan-area networks (MANs), etc. The network 140 may also include both private networks and public networks such as the Internet.

The user device 150 is any type of electronic device that may be used by a user 152 to interact with the chatbot system 100. Non-limiting examples of user devices 150 include a personal computer (desktop or laptop), mobile devices (e.g., personal digital assistant (PDA), smart phone, tablet), cognitive voice assistant devices (e.g., Amazon's Alexa® or Google Home® devices), and Internet of Things (IoT) devices such as, but not limited to, vehicles, home appliances and other items embedded with electronics, software, sensors, actuators, and connectivity which enables these objects to connect and exchange data. In various embodiments, the chatbot system 100 is configured to enable auditory communications as well as textual communications with the user 152 via the user device 150.

In various embodiments, the chatbot system 100 is configured to provide information or answer questions using information contained in a knowledge base 120. The chatbot system 100 may communicate with the knowledge base 120 via a direct communication link or over the network 120. The knowledge base 120 is a repository of information that may comprise a knowledge graph and a corpus of documents such as, but not limited to, publications, books, magazines, articles, research papers, online content, and other data to enable the chatbot system 100 to answer a user's query. A knowledge graph is the representation of a domain knowledge that is based on a graph data structure with nodes and edges that links related data such as facts, people, and places together. Non-limiting examples of knowledge graphs include Yago™ and/or Freebase™. In some embodiments, the chatbot system 100 may also be configured to communicate with the one or more network devices 130 for gathering information pertaining to a user's question.

In the depicted embodiment, the chatbot system 100 comprises a speech recognition module 102, a linguistic analysis module 104, a conversation service module 106, a text generation module 112, and a speech synthesis module 114. In one embodiment, the speech recognition module 102 is configured to perform feature extraction to recognize words and word sequences in a user query. In certain embodiments, the speech recognition module 102 may convert the user query from an analog form to digital form. The speech recognition module 102 may utilize an acoustic model and/or a stochastic language model to determine the probabilities of word sequences. The linguistic analysis module 104 may be configured to syntactic and semantic analysis to determine optimal word sequences, phrase structure, and utterance interpretation.

Once the meaning of a user query is determined, the conversation service module 106 is configured to determine a response to the user query using one or more conversation trees 108 and intent module 110 comprising a plurality of intents. A conversation tree 108 defines the flow of a conversation in the form of a logic tree. Each node of the tree has a condition that triggers it, based on a user input. For example, there may be a conversation tree 108 for enabling a user to search for and reserve a hotel room. There may be another conversation tree 108 for enabling a user to perform banking operations. As stated above, the intent module 110 includes a plurality of intents. An intent, as referenced herein, is a program or application that is directed to the purpose of a user's input (i.e., the actions the users might want to perform with your application). For example, the intent of a question like "Will it rain today" might be called #weather forecast, which is called/executed to determine the weather. By recognizing the intent expressed in a user's input, the conversation service module 106 can choose the correct dialog flow and correct application/intent to call for responding to the user's input.

Once a response to the user's input is determined by the conversation service module 106, the chatbot system 100 may generate a written response using the text generation module 112. The response may also be converted to an audio format using the speech synthesis module 114. The response to the user's input is then sent back to the requesting user device 150. The user 152 may then follow up with a second question based on the received response.

Figure 2:
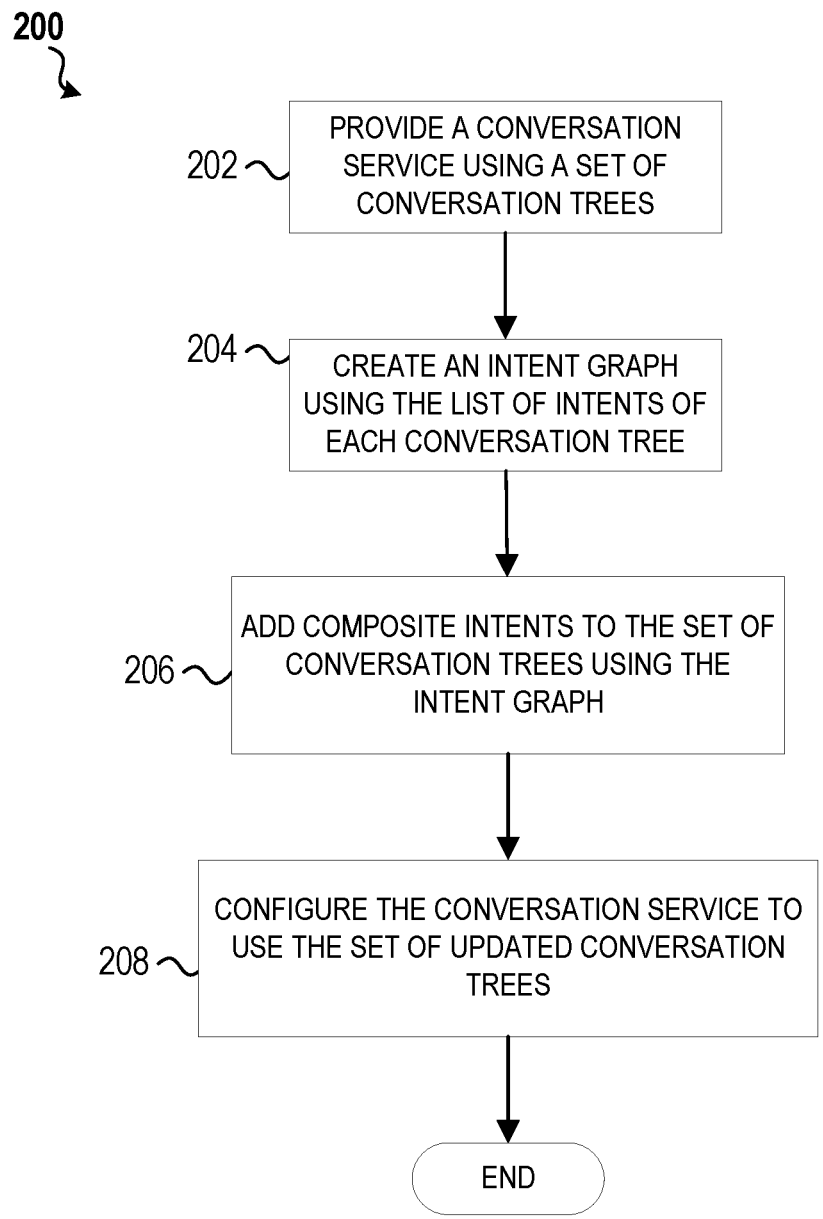
FIG. 2 is a flowchart illustrating a process for supporting combinations of intents in accordance with an embodiment of the present disclosure.

FIG. 2 is a flowchart illustrating a process 200 for supporting combinations of intents in accordance with an embodiment of the present disclosure. In one embodiment, the process 200 may be implemented using software instruction that is executed by the chatbot system 100 of FIG. 1. The process 200 begins, at step 202, by providing a conversation service using a set of conversation trees. In one embodiment, each conversation tree within the set of conversation trees includes a list of intents that define how to answer a certain type of user input.

The process 200, at step 204, creates an intent graph using the list of intents of each conversation tree within the set of conversation trees. An intent graph is a graph that connects entity inputs to entity outputs using an intent node. An entity is a fundamental unit in processing natural language that is mapped to a noun such as people, places, or things. One embodiment for creating an intent graph using the list of intents of each conversation tree within the set of conversation trees is described in FIG. 4. The process 200, at step 206, adds composite intents to the set of conversation trees using the intent graph to generate a set of updated conversation trees. One embodiment for adding composite intents to the set of conversation trees using the intent graph to generate a set of updated conversation trees is described in FIG. 6. The process 200, at step 208, then configures the conversation service to use the set of updated conversation trees that comprises composite intents.

Figure 3A:
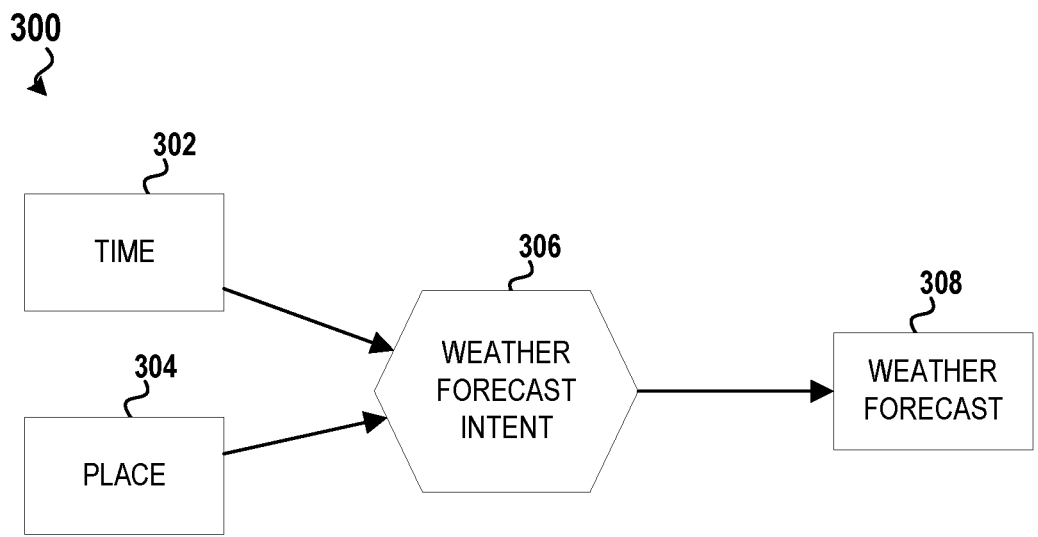
FIG. 3A illustrates a first intent graph in accordance with an embodiment of the present disclosure.

FIG. 3A illustrates a simple intent graph 300 in accordance with an embodiment of the present disclosure. The intent graph 300 may be used to answer the user input "Tell me the weather in (place) (time)." For example, the intent graph 300 may be used to answer the questions "what's the weather today in New York", "tell me the weather in Dallas tomorrow?", or similarly phrased questions. As shown in FIG. 3A, the intent graph 300 includes two input entities 302, 304 that are labelled "TIME" and "PLACE", and one output entity 308 labeled "WEATHER FORECAST." The input entities 302, 304 are connected to the output entity 308 via a weather forecast intent node 306.

Figure 3B:
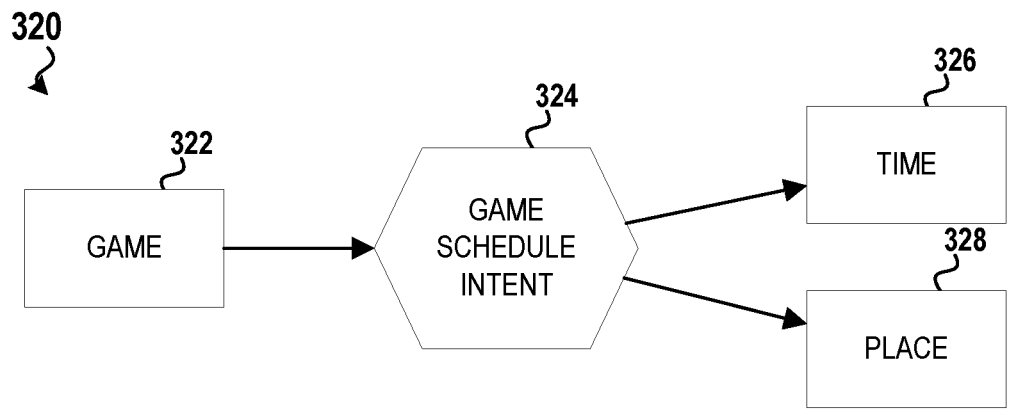
FIG. 3B illustrates second intent graph in accordance with an embodiment of the present disclosure.

FIG. 3B illustrates another simple intent graph 320 in accordance with an embodiment of the present disclosure. The intent graph 320 may be used to answer the user input "When and where is the next (game)?" such as "When and where is the next Dodgers game?" or similarly phrased questions. As shown in FIG. 3B, the intent graph 320 includes one input entity 322 labelled "GAME" and two output entities 326, 328 labeled "TIME" and "PLACE." The input entity 322 is connected to the output entities 326, 328 via a game schedule intent node 324.

Figure 3C:
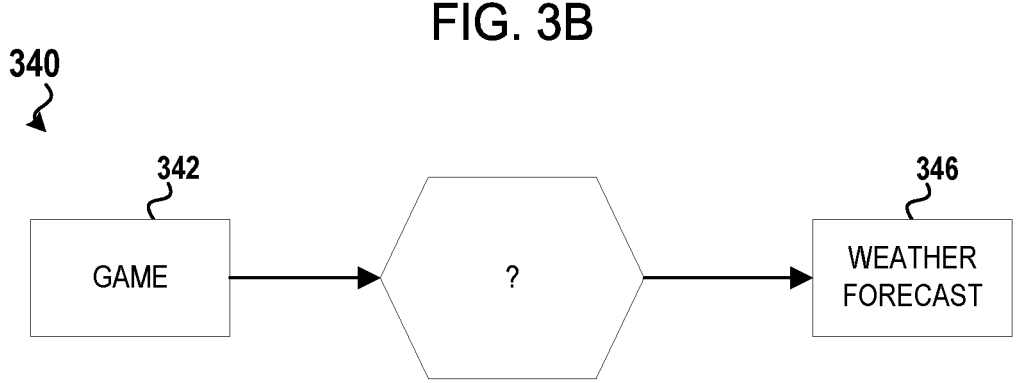
FIG. 3C illustrates a shell of intent graph that is intended to support the combination of intents of the intent graphs of FIG. 3A and FIG. 3B.

FIG. 3C illustrates a shell of intent graph 340 that is intended to support the combination of intents of the intent graph 300 and the intent graph 320. The intent graph 340 has one entity input 342 labelled "GAME" and one entity output 346 labelled "WEATHER FORECAST." The intent graph 340 may be used to answer the combined user input of "Tell me the weather in at the next (game)?" or similarly phrased questions. As stated above, to connect the entity input 342 to the entity output 346, an intent graph is created using the list of intents of each conversation tree within the set of conversation trees (step 204 of process 200), and composite intents is added to the set of conversation trees using the intent graph to generate a set of updated conversation trees (step 206 of process 200) to support the combination of intents.

Figure 4:
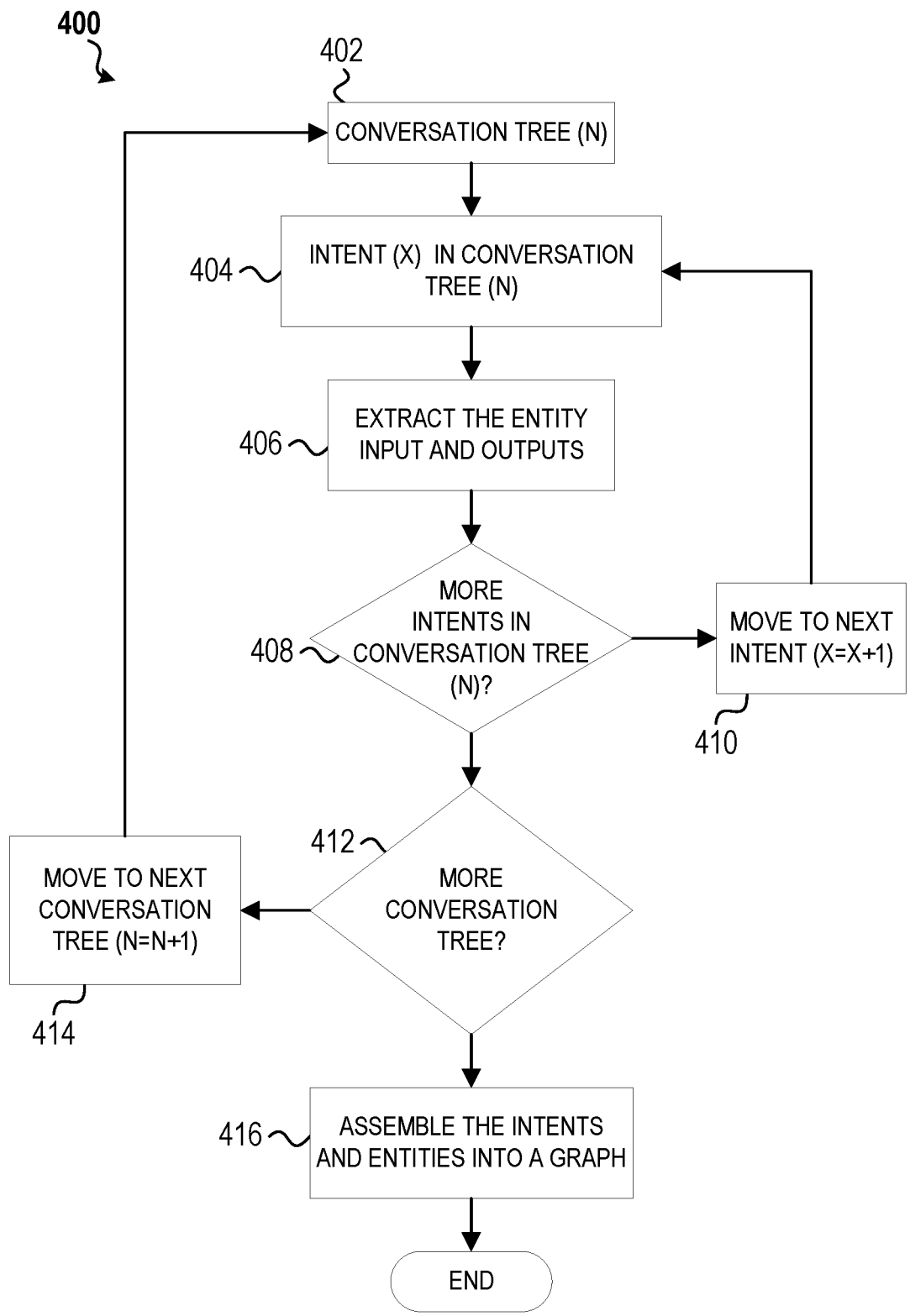
FIG. 4 is a flowchart illustrating a process for creating an intent chart in accordance with an embodiment of the present disclosure.

FIG. 4 is a flowchart illustrating a process 400 for creating an intent chart in accordance with an embodiment of the present disclosure. In one embodiment, the process 400 may be implemented using software instruction that is executed by the chatbot system 100 of FIG. 1. As stated above, the chatbot system 100 provides a conversation service based on one or more conversation trees. Each conversation tree contains a list of intents that define how to answer to a certain type of user input. The user input for each intent is configured using sample utterances/phrases. To create the intent graph, the entity input and outputs are extracted for each intent in each of the conversation trees, which is illustrated by the process 400.

The process 400 begins, at step 402, with the first conversation tree (n), i.e., n=1, and advances to step 404, with the first intent (x), i.e. x=1, of the conversation tree (n). N and X are integer type variables that are used to keep track of the conversation tree and the intents of the conversation tree during the process 400. At step 406, the process 400 determines the entity input(s) and entity output(s) of intent (x) from the sample utterances/phrases of the intent (x). Entities represent a class of object or a data type that is relevant to a user's purpose. Entities with similar or synonymous names may be grouped together. In one embodiment, because users have the ability to define their own entities (e.g. sport game, car, etc. . . . ) and to use pre-canned system entities (e.g., for time and location) in most conversation services, the process 400 can easily extract the input entities from the sample utterances of each intent. For example, an intent may be configured with the following sample utterance "Tell me the weather in (place) (time)." Here, terms in parenthesis indicate that the input entities are place and time. This means that the input entities are already annotated in the sample utterances of an intent and can easily be extracted by the process 400.

In one embodiment, to extract the output entities, the process 400 may use natural language processing (NLP) techniques known in the art to map to the entity types in the training examples/sample utterances to derive the output entities. NLP is the field concerned with computational handling of natural language. NLP is able to convert each string into a series of useful units or tokens (usually words) and perform semantic analysis to determine the meaning of each string. For instance, using the sample utterance of "Tell me the weather in (place) (time)", the process 400 using NLP is able to derive that the user is asking about the "weather" at a particular place and time. Thus, the process 400 is able to identify that the output entity is weather for this intent based on the sample utterances associated with the intent.

Once the process 400 determines the entity input(s) and entity output(s) of intent (x), the process 400 at step 408 determines whether there are additional intents in the conversation tree (n) that need processing, and if so, the process 400 at step 410 moves to the next intent in the conversation tree (n) (e.g., by incrementing the X variable by 1), and repeats the process 400 at step 404 by determining the entity input(s) and entity output(s) of each intent (x) in the conversation tree (n). Once all the intents of conversation tree (n) has been processed to determine their entity input(s) and entity output(s), the process 400 at step 412 determines whether there are additional conversation trees (n) that need processing, and if so, the process 400 at step 414 moves to the next conversation tree (n) (e.g., by incrementing the N variable by 1), and repeats the process 400 at step 402 for each conversation tree (n).

Once all conversation trees have been processed, the process 400 at step 416 assembles the intents, along with their entities (entity inputs and outputs) into an intent graph. In one embodiment, the process 400 creates an intent graph by connecting intent nodes that have an output entity node that is the same as in input entity node of another intent node. For example, if A→$1^{st}$ intent node→B, and B→$2^{nd}$ intent node→C, then the process would connect A→$1^{st}$ intent node→B→$2^{nd}$ intent node→C.

Figure 5:
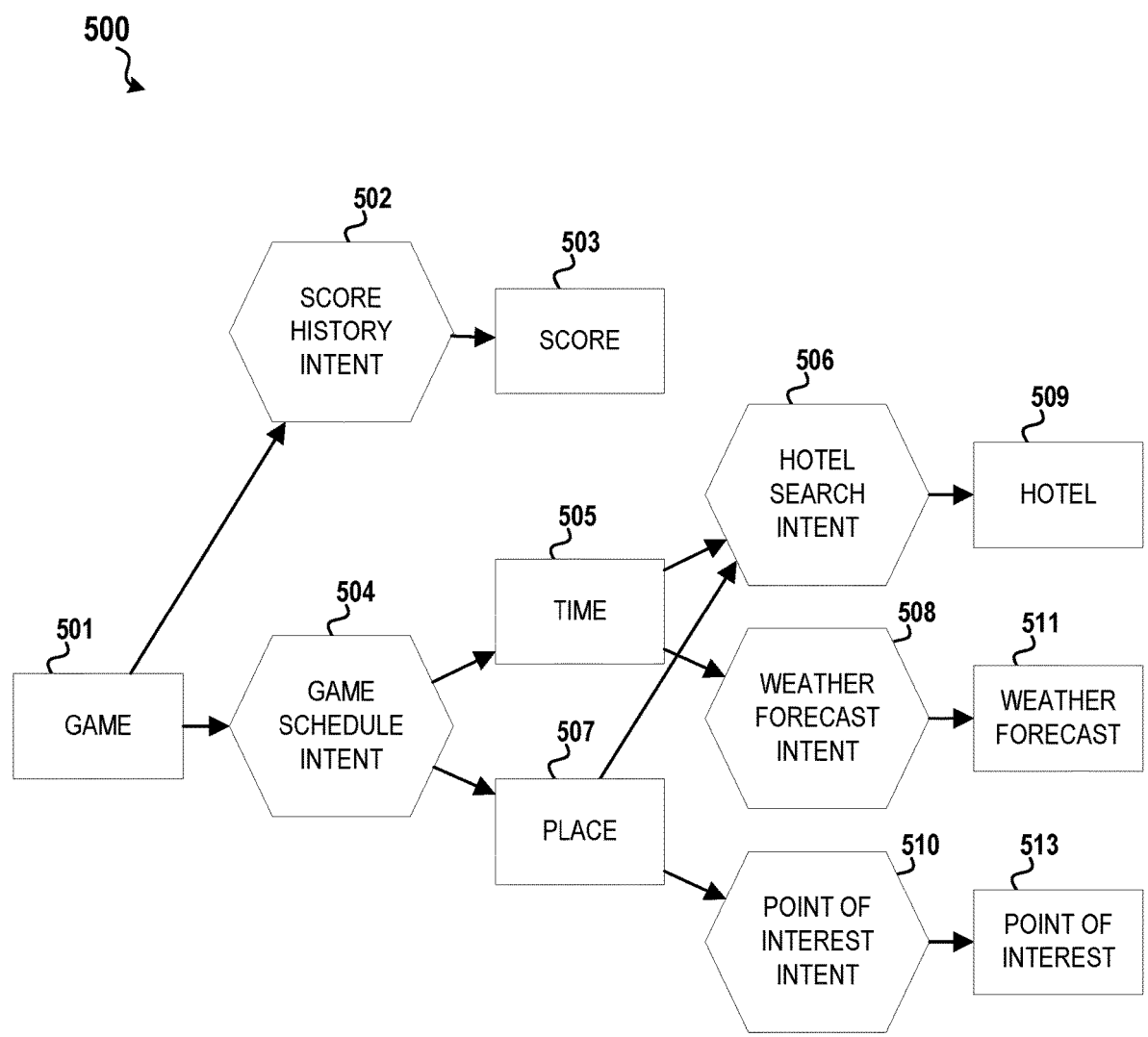
FIG. 5 illustrates an example of an assembled intent graph based on the examples illustrated in FIGS. 3A-3C.

For instance, FIG. 5 illustrates an example of an assembled intent graph 500 based on the examples illustrated in FIGS. 3A-3C. In the depicted example, the graph 500 includes five intent nodes, a score history intent node 502, a game schedule intent node 504, a hotel search intent node 506, a weather forecast intent node 508, and a point of interest intent node 510. Using the process described in FIG. 4, the input entity for the score history intent node 502 is determined to be GAME 501, and the output entity is determined to be SCORE 503. The input entity for the game schedule intent node 504 is also determined to be GAME 501, and the output entities is determined to be TIME 505 and PLACE 507. The input entities for the hotel search intent node 506 are TIME 505 and PLACE 507, and the output entity is HOTEL 509. The input entities for the weather forecast intent node 508 are also TIME 505 and PLACE 507, and the output entity is WEATHER FORECAST 511. The input entity for the point of interest intent node 510 is PLACE 507, and the output entity is POINT OF INTEREST 513.

As shown in the FIG. 5, intent nodes are connected if they share the same input entities or if one of their output/input entity matches the input/output entity of another intent node. For example, the entity PLACE 507 is both an output entity of the game schedule intent node 504 and an input entity for the hotel search intent node 506, the weather forecast intent node 508, and the point of interest intent node 510. Thus, these four intent nodes are connected in the intent graph using the entity PLACE 507 as a common node. Similarly, the entity TIME 505 is both an output entity of the game schedule intent node 504 and an input entity for the hotel search intent node 506 and the weather forecast intent node 508. Thus, these three intent nodes are also connected by the entity TIME 505 as depicted in FIG. 5.

Figure 6:
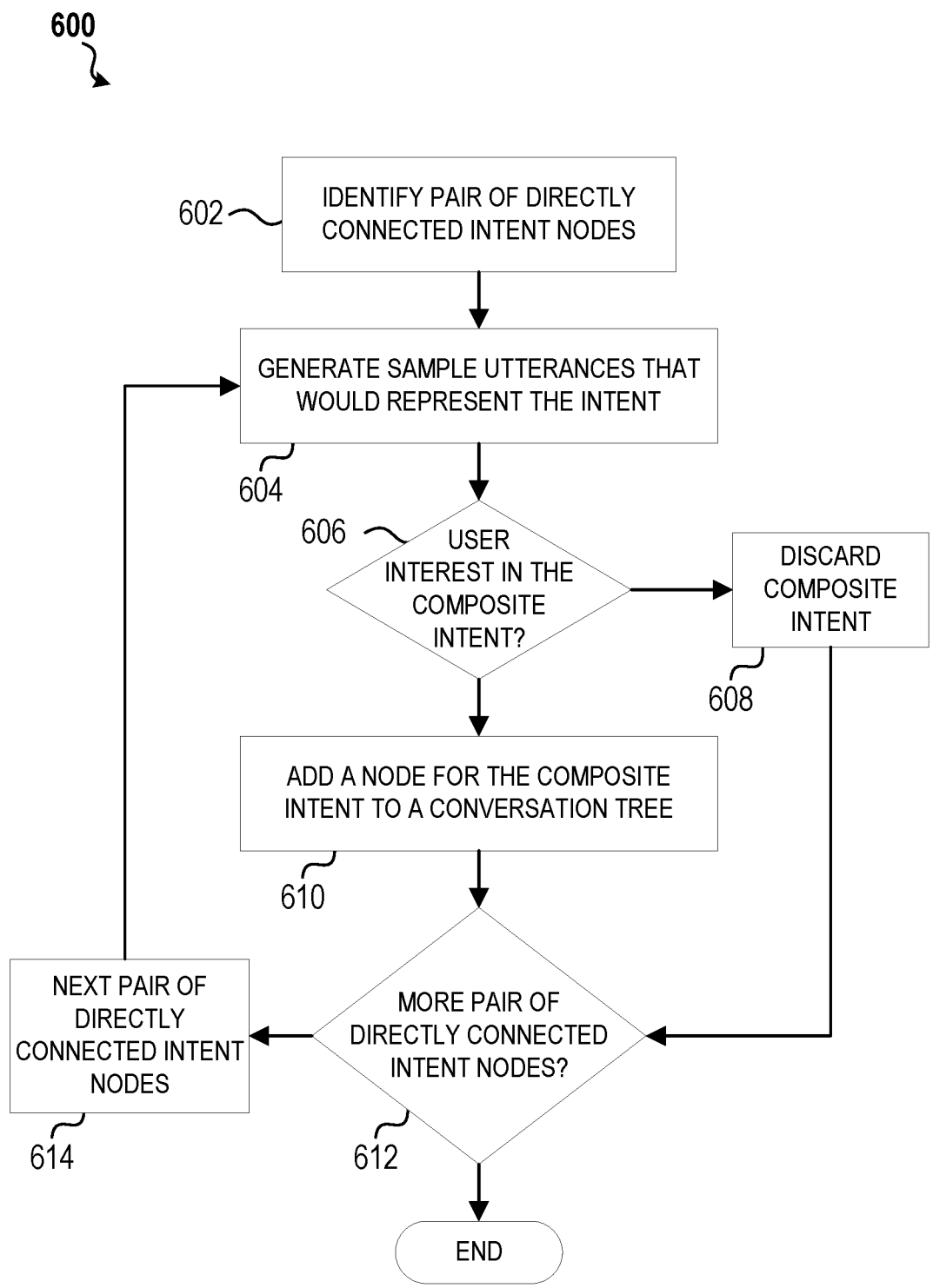
FIG. 6 is a flowchart illustrating process for adding composite intent to a set of conversation trees in accordance with an embodiment the present disclosure.

As stated above in FIG. 2, once the intent graph is created, composite intents are then added to the set of conversation trees, based on the intent graph, to generate a set of updated conversation trees (step 206 of process 200). FIG. 6 is a flowchart illustrating process 600 for adding composite intent to a set of conversation trees in accordance with an embodiment the present disclosure. In one embodiment, the process 600 may be implemented using software instruction that is executed by the chatbot system 100 of FIG. 1. The process 600 begins at step 602 by identifying a pair of directly connected intent nodes. As referenced herein, two intent nodes (e.g., node A and node B) are directly connected if there is a path in the intent graph that includes node A, one or more entity nodes, and node B. At step 604, the process

600 generates sample utterances that would represent the composite intent. In one embodiment, the process 600 may use natural language generation techniques to generate novel training samples using the two main clauses in various relationships. For instance, in various embodiments, to generate the sample utterance, the process 600 retrieves a sample utterance (U1) from the first intent node and a sample utterance (U2) from the second intent node. The process 600 removes the output entities from U1 and the input entities from U2. The process 600 then concatenates U2 with U1. As an example, assume the first sample utterance (U1) is "When and where is the (next game)?" and the second sample utterance (U2) is "What's the weather like in (place) (time)?" In this example, the process 600 may keep "the next game" from U1 and "what's the weather like" from U2. The process 600 then concatenates U2 with U1 to form the sample utterance "What's the weather like at the next (game)" for the composite intent. In various embodiments, the exact wording for the generated utterances can be produced using a logical form-to-sentence tool such as a framenet-annotated corpus. Alternatively, an example embodiment could produce multiple candidate sentences and then validate them with an n-gram language model to select a particular sample utterance.

In certain embodiments, to limit the size of the conversation trees and increase efficiency, the process 600, at step 606, determines whether there is user interest in the composite intent. For example, using the sample utterances generated above, the process 600 may parse the conversation log and determine how many user inputs would be routed to the new composite intent (i.e., the user asking a question that matches the generated sample utterance). As another method, the process 600, using the conversation log, may determine how often the two intents that constitute the new composite intent are called one after the other in rapid succession (i.e., the user asking a U1 and then asking U2). In one embodiment, if the process 600 determines that there is user interest in the combined intent, (e.g., the user interest is above a certain threshold based on at least one of the above two techniques), the process 600 adds a node for the composite intent to a conversation tree at step 610. Otherwise, in one embodiment, if the process 600 determines that there is not enough user interests in the combined intent, the process 600 discards the composite intent at step 608 and does not add it to a conversation tree. In various embodiments, the new intent node may be added to either one of the conversation trees containing the original intents, or to a new conversation tree dedicated to composite intents. Still, in certain embodiments, the process 600 may be configured to add new composite intents to a conversation tree irrespective of user interests.

At step 612 the process 600 determines if there are additional pairs of directly connected intent nodes that may form composite intents in the intent graph. If there are additional pairs of directly connected intent nodes that may form composite intents in the intent graph, the process 600 proceeds to the next pair of directly connected intent nodes in the intent graph at step 614, and repeats the process 600 at step 604 for the next pair of directly connected intent nodes in the intent graph. Although the term next is used, the disclosed embodiments is not limited to any particular sequence or order for processing the pairs of directly connected intent nodes in the intent graph. Once all the pairs of directly connected intent nodes have been processed, the process 600 terminates.

In one embodiment, when the combined intent is invoked by a user input, the chatbot system 100 extracts entity values from user input, calls the first intent node, extracts entity values from first intent response, calls the second intent node, and returns the second intent response as the response to the user input.

Figure 7:
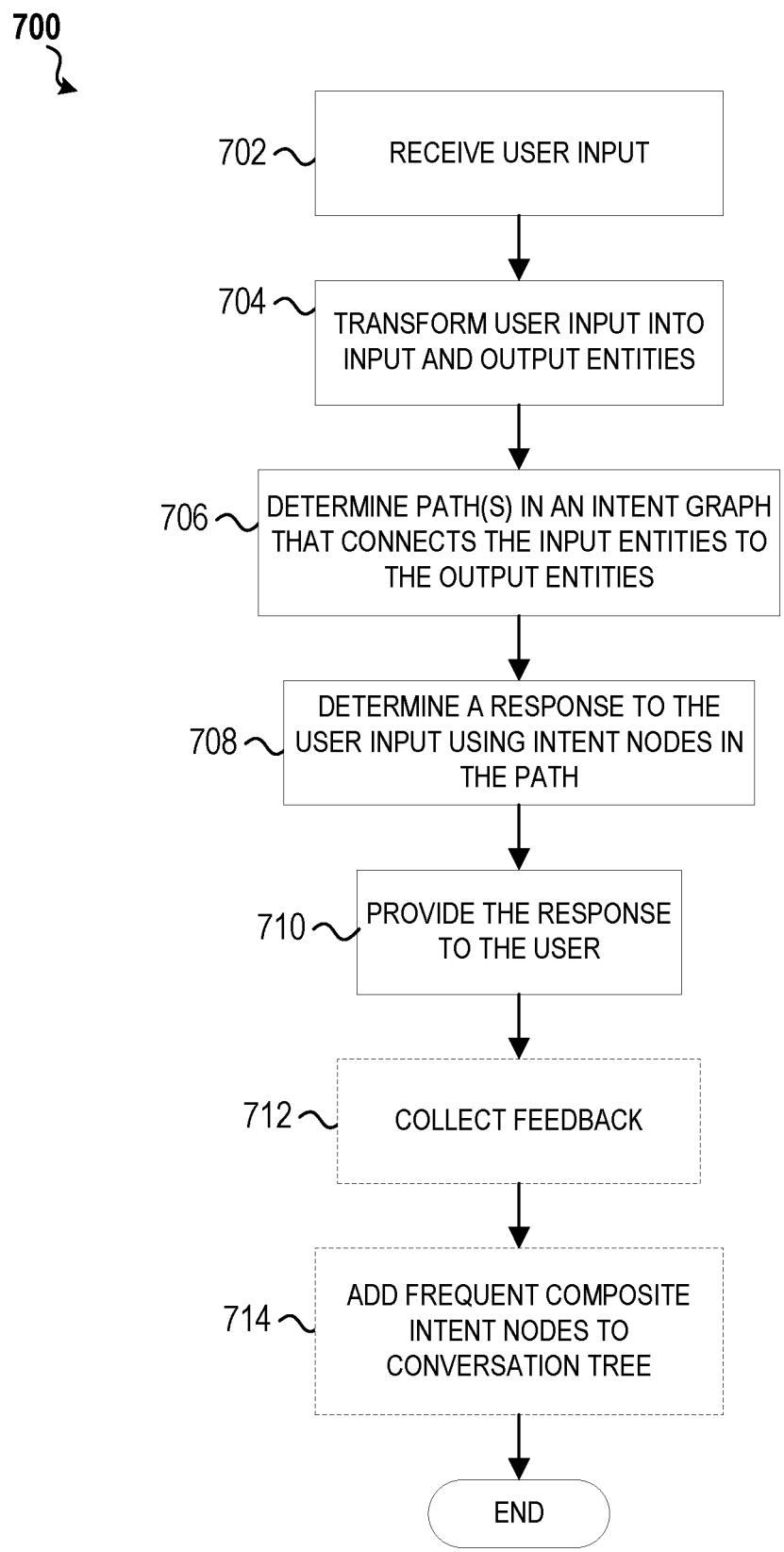
FIG. 7 is a flowchart illustrating process for dynamically responding to user input that comprises a composite intent in accordance with an embodiment the present disclosure.

In addition to the above process, in certain embodiments, composite intent may be handled dynamically (i.e., on the fly) based on a user input comprising a composite intent that has not previously been added to a conversation tree using the above disclosed embodiments. As an example, FIG. 7 is a flowchart illustrating process 700 for dynamically responding to user input that comprises a composite intent in accordance with an embodiment the present disclosure. In one embodiment, the process 700 may be implemented using software instruction that is executed by the chatbot system 100 of FIG. 1. The process 700 begins at step 702 by receiving a user input which is typically in the form of a question. As an example, the user input may be "Find me a hotel to go waterskiing in the Bahamas when the weather is the warmest." At step 704, the process 700 transforms the user input into input and output entities. For instance, in one embodiment, the process 700 may use a natural language parser and entity ontologies defined within the conversation service to extract all the entities in the user input, and determine whether they are input or output entities. In various embodiments, input entities are typically passed by value (e.g. waterskiing warmest weather) whereas the output entities are mentioned by their type (e.g. hotel). In some embodiments, the process 700 may also use the parts of speech to distinguish inputs from outputs.

At step 706, the process 700 determines one or more paths in an intent graph that connects the input entities to the output entities. The input entities are connected to the output entities when two or more directly connected intent nodes use the same inputs and produce the requested output. In one embodiment, if there's more than one input entity, each input entity may be connected/consumed by the same or by a different intent node. Similarly, if there's more than one output entity, each output entity may be produced by the same or by a different intent node.

At step 708, the process determines a response to the user input using the intent nodes of one of the paths. As stated above, there may be more than one possible path. In various embodiments, if there are multiple paths, the process 700 may be configured to select a preferred path based on a variety of criteria such as, but not limited to, path length, number of additional input entities required, occurrences of similar paths in the conversation logs, and previous user feedback if the path has already been tried. Each intent node from the selected intent path is called/executed in sequence from the input entity to the output entity. In some circumstances, a connecting path may require additional input entities that were not provided by the user. In these circumstances, the process 700 may be configured to prompt the user to obtain the additional information (e.g., to create a child node for the intent node). For example, to complete a hotel reservation, the chatbot system 100 may prompt the user for additional personal information. In some embodiments, the process 700 may determine a cardinality difference between the output of an intent node (e.g., returns a list of items) and the input of the next connected intent node (e.g., take a single item as an input). For example, a search using a point of interest (POI) intent node may return multiple places. In this case, if the next intent node connected to the POI intent node takes a single item/place as an input (e.g., a hotel search intent node may be connected to the POI intent node to identify hotels near a particular POI only takes a single POI as an input), the process 700 is configured to loop through the results of the first intent node when running through the subsequent intent nodes, and aggregate the results into a final response.

At step 710, the process 700 provides the response to the user. This may involve sending the response back to the user device, where the response may be displayed and/or audibly played back to the user. In various embodiments, the process 700, at step 712, may be configured to collect feedback from the user to assess the quality of the response. For example, in some embodiments, the process 700 may be configured to perform explicit feedback collection by asking a user to rate the given response or by using some other explicit feedback mechanism. Alternatively, in some embodiments, the process 700 may be configured to collect feedback implicitly based on a user's follow-up input request. For example, if the user's follow-up input request relates to the response (e.g., making a reservation with a hotel given in the response), the process 700 may be configured to implicitly assume that the response was to the satisfaction of the user. However, if the user's follow-up input request relates to a different topic than that associated with the response or if it is a rephrasing of the user's initial input, the process 700 may be configured to implicitly assume that the response was not to the satisfaction of the user. The process 700 may utilize this feedback mechanism to improve future responses to the same or similar user input.

At step 714, the process 700 may optionally add frequent composite intent nodes to a conversation tree. For example, in one embodiment, the process 700 may keep a counter for composite intents that are being asked by users and if the counter exceeds a predetermined threshold that indicates a particular level of user interest in the composite intent, the process 700 may then add the composite intent nodes to a conversation tree of the conversation service.

Figure 8:
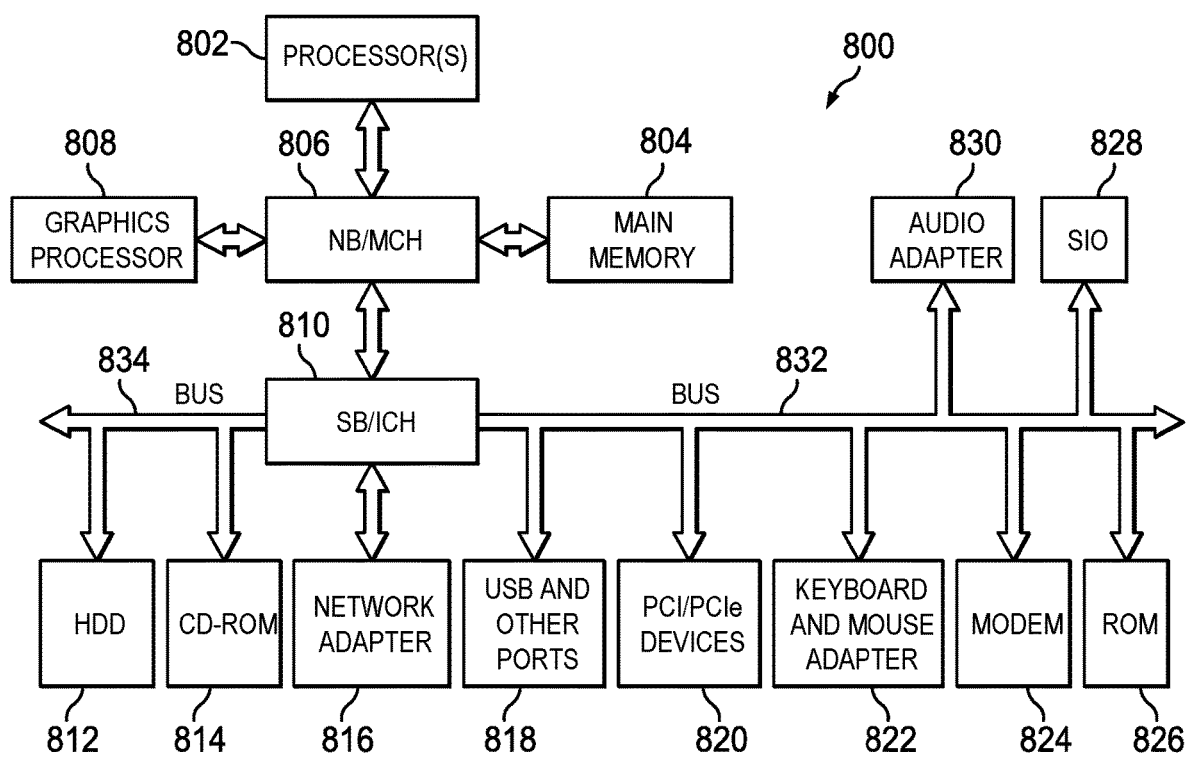
FIG. 8 is a block diagram illustrating a hardware architecture of a system according to an embodiment of the present disclosure.

FIG. 8 is a block diagram illustrating a hardware architecture of a system 800 according to an embodiment of the present disclosure in which aspects of the illustrative embodiments may be implemented. For example, in one embodiment, the chatbot system 100 of FIG. 1 may be implemented using the data processing system 800. Additionally, the data processing system 800 may be configured to store and execute instructions for performing the processes described in FIGS. 3, 4, 6, and 7. In the depicted example, the data processing system 800 employs a hub architecture including north bridge and memory controller hub (NB/MCH) 806 and south bridge and input/output (I/O) controller hub (SB/ICH) 810. Processor(s) 802, main memory 804, and graphics processor 808 are connected to NB/MCH 806. Graphics processor 808 may be connected to NB/MCH 806 through an accelerated graphics port (AGP). A computer bus, such as bus 832 or bus 834, may be implemented using any type of communication fabric or architecture that provides for a transfer of data between different components or devices attached to the fabric or architecture.

In the depicted example, network adapter 816 connects to SB/ICH 810. Audio adapter 830, keyboard and mouse adapter 822, modem 824, read-only memory (ROM) 826, hard disk drive (HDD) 812, compact disk read-only memory (CD-ROM) drive 814, universal serial bus (USB) ports and other communication ports 818, and peripheral component interconnect/peripheral component interconnect express (PCI/PCIe) devices 820 connect to SB/ICH 810 through bus 832 and bus 834. PCI/PCIe devices may include, for example, Ethernet adapters, add-in cards, and personal computing (PC) cards for notebook computers. PCI uses a card bus controller, while PCIe does not. ROM 826 may be, for example, a flash basic input/output system (BIOS). Modem 824 or network adapter 816 may be used to transmit and receive data over a network.

HDD 812 and CD-ROM drive 814 connect to SB/ICH 810 through bus 834. HDD 812 and CD-ROM drive 814 may use, for example, an integrated drive electronics (IDE) or serial advanced technology attachment (SATA) interface. In some embodiments, HDD 812 may be replaced by other forms of data storage devices including, but not limited to, solid-state drives (SSDs). A super I/O (SIO) device 828 may be connected to SB/ICH 810. SIO device 828 may be a chip on the motherboard that is configured to assist in performing less demanding controller functions for the SB/ICH 810 such as controlling a printer port, controlling a fan, and/or controlling the small light emitting diodes (LEDS) of the data processing system 800.

The data processing system 800 may include a single processor 802 or may include a plurality of processors 802. Additionally, processor(s) 802 may have multiple cores. For example, in one embodiment, data processing system 800 may employ a large number of processors 802 that include hundreds or thousands of processor cores. In some embodiments, the processors 802 may be configured to perform a set of coordinated computations in parallel.

An operating system is executed on the data processing system 800 using the processor(s) 802. The operating system coordinates and provides control of various components within the data processing system 800 in FIG. 8. Various applications and services may run in conjunction with the operating system. Instructions for the operating system, applications, and other data are located on storage devices, such as one or more HDD 812, and may be loaded into main memory 804 for execution by processor(s) 802. In some embodiments, additional instructions or data may be stored on one or more external devices. The processes described herein for the illustrative embodiments may be performed by processor(s) 802 using computer usable program code, which may be located in a memory such as, for example, main memory 804, ROM 826, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for supporting combinations of intents, the computer-implemented method comprising:
    providing a conversation service included in a chatbot system using a set of conversation trees, each conversation tree within the set of conversation trees comprises a list of intents that define how to answer to a certain type of user input;
    creating an intent graph using the list of intents of each conversation tree within the set of conversation trees;
    adding composite intents to the set of conversation trees using the intent graph to generate a set of updated conversation trees; and
    configuring the conversation service included in the chatbot system to use the set of updated conversation trees that comprises composite intents to interpret a natural language input.

2. The computer-implemented method of claim 1, wherein creating the intent graph using the list of intents of each conversation tree within the set of conversation trees comprises:
- determining an entity input and entity outputs for each intent in the list of intents for each conversation tree within the set of conversation trees; and
- assembling the entity input and the entity outputs for each intent in the list of intents for each conversation tree within the set of conversation trees to create the intent graph.

3. The computer-implemented method of claim 1, wherein adding composite intents to the set of conversation trees comprises generating a sample utterance for a new composite intent.

4. The computer-implemented method of claim 3, wherein generating the sample utterance for the new composite intent comprises:
- removing output entities from a first sample utterance for a first intent node of the new composite intent to produce a first portion of the sample utterance for the new composite intent;
- removing input entities from a second sample utterance for a second intent node of the new composite intent to produce a second portion of the sample utterance for the new composite intent; and
- combining the first portion of the sample utterance for the new composite intent and second portion of the sample utterance for the new composite intent to generate the sample utterance for the new composite intent.

5. The computer-implemented method of claim 1, wherein adding composite intents to the set of conversation trees comprises:
- assessing a user interest in a new composite intent prior to adding the new composite intent to the set of conversation trees by determining whether the user interest in the new composite intent exceeds a predetermined threshold; and
- adding the new composite intent to the set of conversation trees in response to a determination that the user interest in the new composite intent exceeds the predetermined threshold.

6. The computer-implemented method of claim 5, wherein assessing the user interest in the new composite intent comprises:
- parsing a conversation log; and
- determining a number of user inputs that would be routed to the new composite intent.

7. The computer-implemented method of claim 5, wherein assessing the user interest in the new composite intent comprises:
- parsing a conversation log; and
- determining how often a first intent and a second intent that constitute the new composite intent are called in sequence within a predetermined period.

8. The computer-implemented method of claim 1, wherein adding composite intents to the set of conversation trees comprises adding a new intent node to at least one of the conversation trees in the set of conversation trees that includes an original intent that forms part of a new composite intent.

9. The computer-implemented method of claim 1, wherein adding composite intents to the set of conversation trees comprises adding the composite intents to a new conversation tree dedicated to composite intents.

10. A chatbot system configured to support combinations of intents, the system comprising memory for storing instructions, and a processor configured to execute the instructions to:
- provide a conversation service included in the chatbot system using a set of conversation trees, each conversation tree within the set of conversation trees comprises a list of intents that define how to answer to a certain type of user input;
- create an intent graph using the list of intents of each conversation tree within the set of conversation trees;
- add composite intents to the set of conversation trees using the intent graph to generate a set of updated conversation trees; and
- configure the conversation service included in the chatbot system to use the set of updated conversation trees that comprises composite intents to interpret a natural language input.

11. The system of claim 10, wherein the processor further executes instructions to:
- extract an entity input and entity outputs for each intent in the list of intents for each conversation tree within the set of conversation trees; and
- assemble the entity input and the entity outputs for each intent in the list of intents for each conversation tree within the set of conversation trees to create the intent graph.

12. The system of claim 10, wherein the processor further executes instructions to generate a sample utterance for a new composite intent.

13. A computer program product for supporting combinations of intents, the computer program product comprising a computer readable storage medium having program instructions embodied therewith, the program instructions executable by a processor to cause the processor to:
- provide a conversation service included in a chatbot system using a set of conversation trees, each conversation tree within the set of conversation trees comprises a list of intents that define how to answer to a certain type of user input;
- create an intent graph using the list of intents of each conversation tree within the set of conversation trees;
- add composite intents to the set of conversation trees using the intent graph to generate a set of updated conversation trees; and
- configure the conversation service included in the chatbot system to use the set of updated conversation trees that comprises composite intents to interpret a natural language input.

14. The computer program product of claim 13, further comprising program instructions executable by the processor to cause the processor to:
- determine an entity input and entity outputs for each intent in the list of intents for each conversation tree within the set of conversation trees; and
- assemble the entity input and the entity outputs for each intent in the list of intents for each conversation tree within the set of conversation trees to create the intent graph.

15. The computer program product of claim 13, further comprising program instructions executable by the processor to cause the processor to generate a sample utterance for a new composite intent.

16. The computer program product of claim 15, further comprising program instructions executable by the processor to:

remove output entities from a first sample utterance for a first intent node of the new composite intent to produce a first portion of the sample utterance for the new composite intent;

remove input entities from a second sample utterance for a second intent node of the new composite intent to produce a second portion of the sample utterance for the new composite intent; and combine the first portion of the sample utterance for the new composite intent and second portion of the sample utterance for the new composite intent to generate the sample utterance for the new composite intent.

17. The computer program product of claim 13, further comprising program instructions executable by the processor to cause the processor to:

assess a user interest in a new composite intent prior to adding the new composite intent to the set of conversation trees by determining whether the user interest in the new composite intent exceeds a predetermined threshold; and add the new composite intent to the set of conversation trees in response to a determination that the user interest in the new composite intent exceeds the predetermined threshold.

18. The computer program product of claim 17, further comprising program instructions executable by the processor to cause the processor to:

parse a conversation log; and determine a number of user inputs that would be routed to the new composite intent.

19. The computer program product of claim 17, further comprising program instructions executable by the processor to cause the processor to:

parse a conversation log; and determine how often a first intent and a second intent that constitute the new composite intent are called in sequence within a predetermined period.

20. The computer program product of claim 13, wherein adding composite intents to the set of conversation trees comprises adding a new intent node to at least one of the conversation trees in the set of conversation trees that includes an original intent that forms part of a new composite intent.

\* \* \* \* \*